(12) United States Patent
Xiao et al.

(10) Patent No.: US 8,532,436 B2
(45) Date of Patent: Sep. 10, 2013

(54) METHOD AND APPARATUS FOR SCALING AN IMAGE IN SEGMENTS

(75) Inventors: Xiao Xiao, Shanghai (CN); Hai Chen, Shenzhen (CN); Yu Liu, Shanghai (CN)

(73) Assignee: Huawei Device Co., Ltd., Shenzhen (CN)

( * ) Notice: Subject to any disclaimer, the term of this patent is extended or adjusted under 35 U.S.C. 154(b) by 263 days.

(21) Appl. No.: 13/044,884

(22) Filed: Mar. 10, 2011

(65) Prior Publication Data

US 2011/0222728 A1    Sep. 15, 2011

(30) Foreign Application Priority Data

Mar. 10, 2010   (CN) .......................... 2010 1 0134545

(51) Int. Cl.
*G06K 9/32* (2006.01)

(52) U.S. Cl.
USPC ....................................................... 382/298

(58) Field of Classification Search
USPC ........... 345/472, 660; 348/445, 556, E5.111, 348/913; 358/3.2; 382/190, 192, 195, 298; 715/800, 801, 815
See application file for complete search history.

(56) References Cited

U.S. PATENT DOCUMENTS

| 2008/0019439 | A1 | 1/2008 | Lee |
| 2009/0190846 | A1 | 7/2009 | Mevissen |
| 2011/0200098 | A1* | 8/2011 | Kim et al. ................ 375/240.02 |

FOREIGN PATENT DOCUMENTS

| CN | 101093659 A | * | 12/2007 |
| CN | 101467178 A | * | 6/2009 |

OTHER PUBLICATIONS

First Chinese Office Action of Chinese Application No. 201010134545.3, dated Apr. 26, 2011, 8 pages.*
Second Chinese Office Action of Chinese Application No. 201010134545.3, dated Mar. 27, 2012, 12 pages.*
Translation of Rejection Decision of Chinese Application No. 201010134545.3 mailed Oct. 22, 2012, 13 pages.

* cited by examiner

*Primary Examiner* — Gregory F Cunningham
(74) *Attorney, Agent, or Firm* — Slater & Matsil, L.L.P.

(57) ABSTRACT

A method and an apparatus for scaling an image in segments are disclosed. The method includes: identifying scene features in each input video frame, and obtaining information about distribution of multiple features in the video frame; obtaining multiple feature distribution areas corresponding to the information about distribution of the multiple features, and obtaining multiple scale coefficients; and scaling the corresponding multiple feature distribution areas in each video frame according to the multiple scale coefficients.

22 Claims, 4 Drawing Sheets

1. Border feature

2. Linear feature

3. Encircling feature

METHOD AND APPARATUS FOR SCALING AN IMAGE IN SEGMENTS

This application claims priority to Chinese Patent Application No. 201010134545.3, filed on Mar. 10, 2010, which is hereby incorporated by reference in its entirety.

TECHNICAL FIELD

The present disclosure relates to digital image scaling technologies, and in particular, to a method and an apparatus for scaling an image in segments.

BACKGROUND

In a display device, many media applications involve the digital image scaling technology. Currently, most display terminals have wide screens such as 16:9 screens. The common resolution of mobile communication terminals is Wide Quarter Video Graphics Array (WQVGA), which represents a screen resolution of 480×272 (aspect radio being 16:9) or 400×240 (aspect ratio being 5:3); or Wide Video Graphics Array (WVGA), which provides a resolution of 800×480 pixels. However, most video sources provide the traditional 4:3 aspect ratio. Consequently, when a user watches videos on the wide screen of a terminal, the scales of the video sources are different from the scale of the display screen, and the video sources need to be scaled up or down so that the video sources are adapted for the size of the display screen.

In the process of implementing the present disclosure, the inventor finds at least the following problems in the prior art: Currently, display devices use traditional scaling methods to implement such functions. For example, in an equal-ratio scaling solution in the prior art, the video sources are adapted to the target video size (screen size) simply, which distorts the scene features in the video, especially scenes of persons, and deteriorates the display effect and user experience. In a fixed segmental scaling solution in the prior art, some of the drawbacks in the foregoing solution are overcome, but the segments are fixed, namely, a small scale coefficient is applied to the middle area, but a great scale coefficient is applied to side areas of an image. If a person is not in the middle area, but moves between different areas of the video, the video is distorted drastically, which deteriorates the user experience. In another scaling solution in the prior art, images are defined as a concept of energy. Image "seams" are inserted or deleted repeatedly for the image content in a certain direction in an attempt to change the image scale, and an insertion or deletion mode that minimizes change of the image energy is selected. To put it simply, this scaling solution makes modification in the areas that provide few details of the image, so as to change the image scale. Such a technique exists as software in desktop computers currently, and is rather popular. However, the scaling solution conflicts with the concept of streamline design. The technique makes repeated attempts to find the optimum value, which involves too many uncertainties. The implementation of such a technique is difficult, and it is almost impossible to implement the technique in the hardware of a cost-efficient device with low power consumption in the iteration process. In conclusion, the prior art leads to distortion of the scaled image, brings adverse effects such as fattened and shortened persons in the image, and deteriorates the user experience.

SUMMARY OF THE INVENTION

Embodiments of the present disclosure provide a method and an apparatus for scaling an image in segments to display key features (such as persons) in an image scene always at a proper scale.

A method for scaling an image in segments in an embodiment of the present disclosure includes: identifying scene features in each input video frame, and obtaining information about distribution of multiple features in the video frame; obtaining multiple feature distribution areas corresponding to the information about distribution of the multiple features, and obtaining multiple scale coefficients corresponding to the multiple feature distribution areas; and scaling the multiple feature distribution areas in each video frame according to the multiple scale coefficients.

An apparatus for scaling an image in segments in an embodiment of the present disclosure includes: a scene identifying unit, configured to identify scene features in each input video frame, and obtain information about distribution of multiple features in the video frame; and a segmental scaling unit, configured to: obtain multiple feature distribution areas corresponding to the information about distribution of the multiple features, and obtain multiple scale coefficients corresponding to the multiple feature distribution areas; and scale the corresponding multiple feature distribution areas in each video frame according to the multiple scale coefficients.

The technical solution under the present disclosure brings at least these benefits: The dynamic segmental scaling technique displays key features (such as persons) in an image scene always at a proper scale, and significantly improves the experience of watching videos on a wide screen.

BRIEF DESCRIPTION OF THE DRAWINGS

To make the technical solution under the present disclosure clearer, the following outlines the accompanying drawings involved in the description of the embodiments of the present disclosure. Apparently, the accompanying drawings outlined below are not exhaustive, and those skilled in the art can derive other drawings from such accompanying drawings without any creative effort.

DETAILED DESCRIPTION OF ILLUSTRATIVE EMBODIMENTS

The detailed description is provided with reference to the accompanying drawings to provide a thorough understanding of the present disclosure. Evidently, the drawings and the detailed description are merely representative of particular embodiments of the present disclosure, and the embodiments are illustrative in nature and not exhaustive. All other embodiments, which can be derived by those skilled in the art from the embodiments given herein without any creative effort, shall fall within the scope of the present disclosure.

Figure 1:
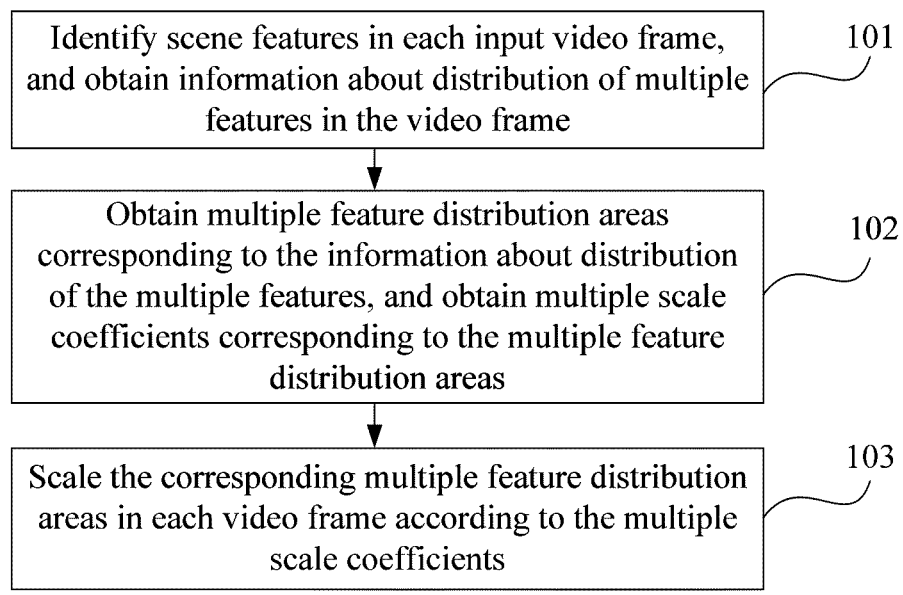
FIG. 1 is a flowchart of a method for scaling an image in segments in an embodiment of the present disclosure.

FIG. 1 is a flowchart of a method for scaling an image in segments in an embodiment of the present disclosure. The method includes the following steps.

101. Identify scene features in each input video frame, and obtain information about distribution of multiple features in the video frame.

Optionally, the information about distribution of multiple features in a video frame includes an importance grade coefficient of each feature in the distribution. An analysis method based on color recognition or an analysis method based on feature matching may be used to identify scene features of each input video frame. Specifically, the analysis method based on feature matching may be a face detection method, and the face detection method may be a Haar detection method.

102. Obtain multiple feature distribution areas corresponding to the information about distribution of the multiple features, and obtain multiple scale coefficients corresponding to the multiple feature distribution areas.

Optionally, the method in this embodiment can obtain multiple feature distribution areas corresponding to the information about distribution of the multiple features according to the importance grade coefficient of each feature in the distribution, and obtain multiple scale coefficients corresponding to the multiple feature distribution areas.

103. Scale the corresponding multiple feature distribution areas in each video frame according to the multiple scale coefficients.

Optionally, according to multiple scale coefficients, a fourth-order 32-phase interpolation algorithm is applied in the horizontal direction in multiple feature distribution areas in each video frame respectively, and a second-order 32-phase interpolation algorithm is applied in the vertical direction in the multiple feature distribution areas. An interpolation filtering unit is used uniformly, and a same interpolator is reused on a time-sharing basis in the horizontal direction and the vertical direction respectively to scale an image.

In the technical solution in this embodiment, the dynamic segmental scaling technique displays key features (such as persons) in an image scene always at a proper scale, and significantly improves the experience of watching videos on a wide screen.

Figure 2:
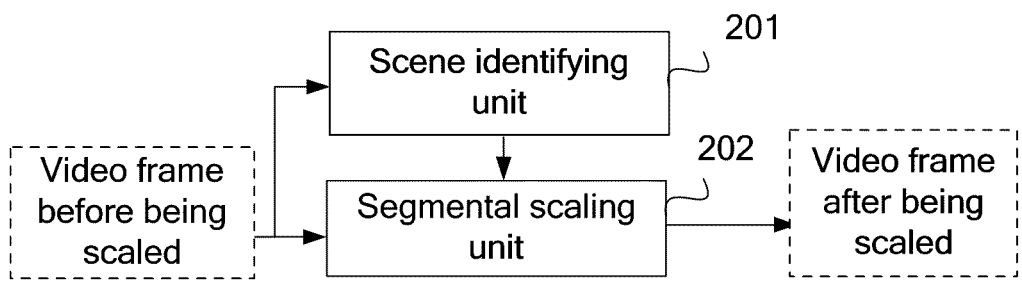
FIG. 2 shows a structure of an apparatus for scaling an image in segments in an embodiment of the present disclosure.

Corresponding to the foregoing method embodiment, an apparatus for scaling an image in segments intelligently and dynamically is provided in an embodiment of the present disclosure to overcome the drawbacks in the prior art. FIG. 2 shows a structure of an apparatus for scaling an image in segments in an embodiment of the present disclosure. The apparatus may include: a scene identifying unit 201, configured to identify scene features in each input video frame, and obtain information about distribution of multiple features in the video frame; and a segmental scaling unit 202, configured to: obtain multiple feature distribution areas corresponding to the information about distribution of the multiple features, and obtain multiple scale coefficients corresponding to the multiple feature distribution areas; and scale the corresponding multiple feature distribution areas in each video frame according to the multiple scale coefficients.

Optionally, the information about distribution of multiple features in a video frame, which is obtained by the scene identifying unit 201, includes an importance grade coefficient of each feature in the distribution. The scene identifying unit 201 is further configured to use an analysis method based on color recognition or an analysis method based on feature matching to identify the scene features of each input video frame. Specifically, the analysis method based on feature matching may be a face detection method, and the face detection method may be a Haar detection method. The scene identifying unit 201 splits the video frame before being scaled into image blocks at a set granularity (for example, 4×4, 8×8, or 32×32), and then matches the content feature or analyzes features such as the color feature to obtain the importance grade coefficient of each image block. The importance grade coefficients of all image blocks compose the information about distribution of important features of the video frame.

Optionally, the segmental scaling unit 202 is further configured to obtain multiple feature distribution areas corresponding to the information about distribution of the multiple features according to the importance grade coefficient of each feature in the distribution, and obtain multiple scale coefficients corresponding to the multiple feature distribution areas. The segmental scaling unit 202 is further configured to: apply a fourth-order 32-phase interpolation algorithm in the horizontal direction and a second-order 32-phase interpolation algorithm in the vertical direction in multiple feature distribution areas in each video frame respectively according to multiple scale coefficients, use the same interpolation filtering unit for the horizontal direction and the vertical direction, and reuse a same interpolator on a time-sharing basis in the horizontal direction and the vertical direction respectively to scale the image. The segmental scaling unit 202 adjusts the segments dynamically according to the information about distribution of important features, and scales each segment in the following way: First, the segmental scaling unit 202 adjusts the segments of the video frame dynamically according to the information about distribution of important features output by the scene identifying unit 201, where the granularity of the segmentation may be the same as or different from the granularity applied by the scene identifying unit 201 for splitting an image into blocks; secondly, the segmental scaling unit 202 calculates the scale coefficient of each segment according to the overall scale and the information about distribution of important features; and finally, the segmental scaling unit 202 scales the video frame according to the scale coefficient of each segment.

In the content of a video, persons are generally more important than the background. Therefore, the following analysis uses persons as important features of the scene. In the case that other features (such as motions and video details) are important features of the scene, those skilled in the art can easily derive the solution from the technical solution disclosed herein and the prior art, and the derivative solution shall fall within the scope of the present disclosure.

The scene identifying unit 201 analyzes the image blocks intelligently and generates the importance grade coefficients of the corresponding image blocks. The importance grade coefficients of all image blocks compose the information about distribution of important features of the video frame. The intelligent analysis here may be an analysis method based on color recognition or an analysis method based on feature matching.

a. Analysis Method Based on Color Recognition

Figure 3:
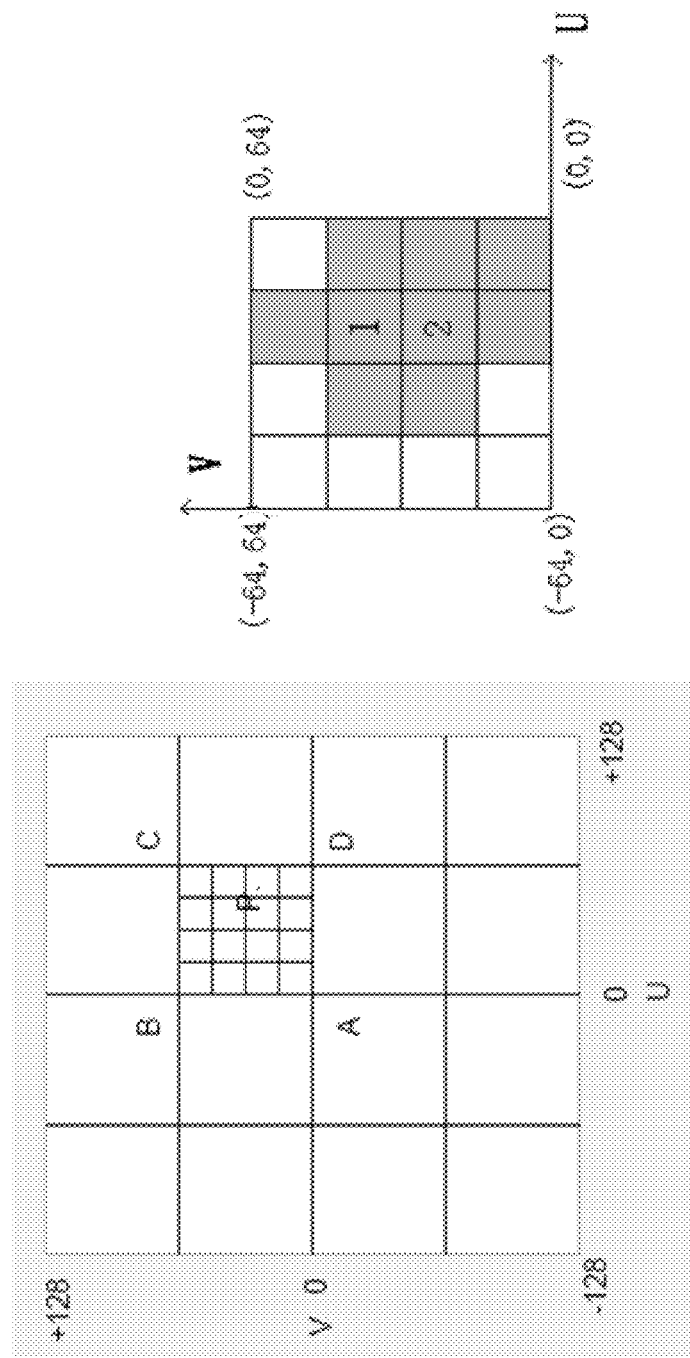
FIG. 3 shows how a skin color is distributed in a UV space in an embodiment of the present disclosure.

The color in a video is a common means of measuring importance grade of the content. Statistically, in a UV chrominance space (UV represents chrominance components and color differences; U and V are two components that make up a color), the skin color of persons is centralized in several areas; some colors are obviously background colors, for example, sky (blue), lawn (green), rural land (yellow soil), and urban land (grey). FIG. 3 shows how a skin color is distributed in a UV space in an embodiment of the present disclosure. Point P in the left part of FIG. 3 is an area where the skin color is centralized, and it corresponds to the pigmented area in the right part of the figure. Therefore, the skin color recognition gives a rough conclusion that the (U, V) value of the pixel falls within ([−48, 0], [0, 64]).

For the image block corresponding to point P, according to the foregoing method, the number of pixels (Ni) that fall within the skin color can be counted; and the number of pixels (Mi) that compose the background can be counted in the same way. The importance grade coefficient of the image block can be calculated by using the following formula:

$$w_i = t + a*N_i - b*M_i \quad (1)$$

In the formula above, t is a benchmark coefficient, and a and b are weighting coefficients for persons and the background.

b. Analysis Method Based on Feature Matching

The face detection method based on feature matching (or detection of other objects) is mature. When a human face is displayed completely, the probability of detecting the face correctly is over 90%. The process of detecting human faces is very mature. For example, the face is detected by using a Haar detection method in this way: First, preprocess the image to enhance the contrast; and then scale the image to different extents to obtain images of different resolutions; for the image of each resolution, perform feature matching for a specific macro block (such as 16×16) in a specific path (for example, Y or UV, where Y represents luminance) so as to obtain the feature statistic information in each position; finally, compare the feature statistic information with the preset face feature template; if the feature statistic information matches the preset face feature template, output the face center position o of the original image and the radius r.

Figure 4:
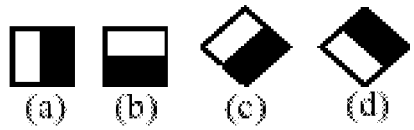
FIG. 4 shows a feature matching template applied to various features in an embodiment of the present disclosure.
Figure 4:
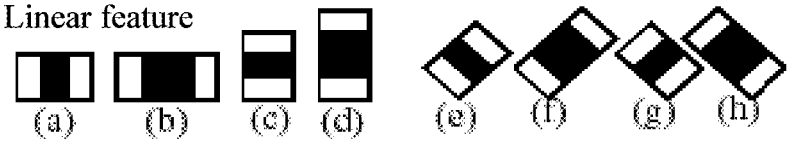
Figure 4:

Before feature matching, the method in this embodiment sharpens the chrominance space so that all features are more prominent and that the result of feature matching is more accurate. The feature information of a person is composed of three features: border feature, linear feature and encircling feature. Each feature needs to be matched through several templates. In this embodiment, Haar feature matching is applied. FIG. 4 shows the feature matching template applied to each feature.

The central position of the detected face is used as the center, and the importance grade coefficient of the image block can be calculated by using formula (2) below. In formula (2), o is the central position of the human face, r is the radius of the face, a is a weighting coefficient, and dis|Ni−o| is the distance from the position of o to the position of the current block (the distance may be Euclidean distance or other distance).

$$w_i = t + a*dis|N_i - o|/r \quad (2)$$

Generally, the method based on color recognition can be implemented through software. The method is simple and widely applicable. In the case that the features are displayed completely, the analysis result based on feature matching is more accurate, and the analysis process is more complicated.

The segmental scaling unit 202 implements the function of scaling the whole image, and can configure the size of up to nine areas in the horizontal direction and the scale coefficient dynamically. A fourth-order 32-phase interpolation algorithm is applied in the horizontal direction in all areas, and a second-order 32-phase interpolation algorithm is applied in the vertical direction in all areas. The whole segmental scaling unit 202 uses an interpolation filtering unit uniformly, and a same interpolator is reused on a time-sharing basis in the horizontal direction and the vertical direction. It should be noted that the scaling algorithm in this embodiment is not limited to a fourth-order 32-phase interpolation algorithm in the horizontal direction and a second-order 32-phase interpolation algorithm in the vertical direction. Other algorithms are also applicable.

Figure 5:
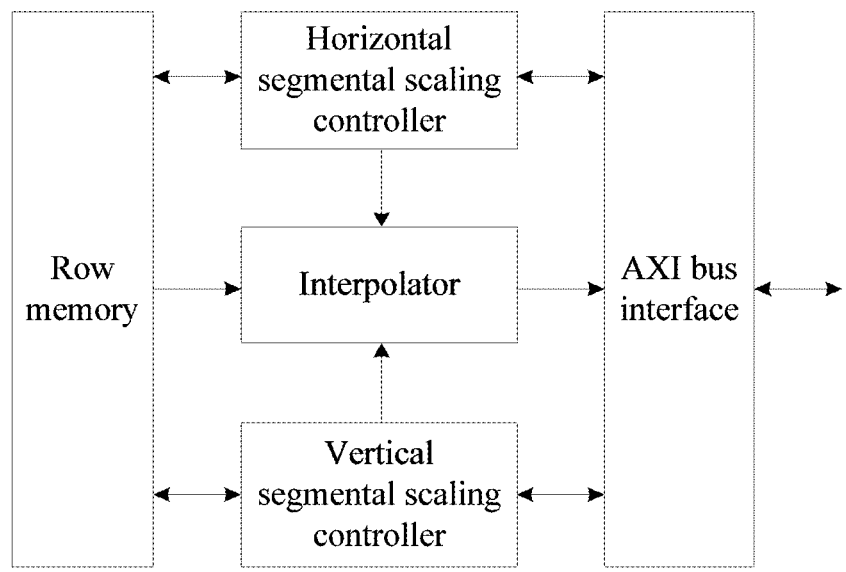
FIG. 5 shows a structure of a segmental scaling unit in an embodiment of the present disclosure.

FIG. 5 shows a structure of a segmental scaling unit in an embodiment of the present disclosure. The segmental scaling unit includes: a row memory, a horizontal segmental scaling controller, a vertical segmental scaling controller, an interpolator, and an Advanced eXtensible Interface (AXI) bus interface, as detailed below.

The horizontal segmental scaling controller generates the horizontal interpolation position and controls the horizontal interpolation process. After obtaining the right of using the interpolator (IPR), the horizontal segmental scaling controller reads Red Green Blue (RGB) data from the bus interface, calculates the interpolation position, and searches the table to obtain the horizontal interpolation weight value "hrz_power"; calculates the target pixel data of eight rows, stores the data into the memory, releases the right of using the IPR, and performs the foregoing operations again when obtaining the right of using the IPR next time.

The interpolator applies a fourth-order 32-phase interpolation algorithm for horizontal interpolation, and applies a second-order 32-phase interpolation algorithm for vertical interpolation to calculate the interpolation pixels. The horizontal interpolation and the vertical interpolation are controlled by the hrz_scl_busy signal sent by the horizontal segmental scaling controller.

If the current vertical interpolation occurs between two current rows, the vertical segmental scaling controller performs an interpolation operation directly, and does not give up the right of using the IPR until completion of interpolation for the whole row. If the interpolation occurs between the next two rows instead of the current two rows, the data of a new row needs to be loaded, and interpolation needs to be calculated. Therefore, the interpolator performs interpolation for 8 consecutive times as soon as the data of every 8 horizontal new pixels is received. If the interpolation does not occur between the next two rows, no interpolation calculation is required, and no vertical interpolation operation is required.

Figure 6:
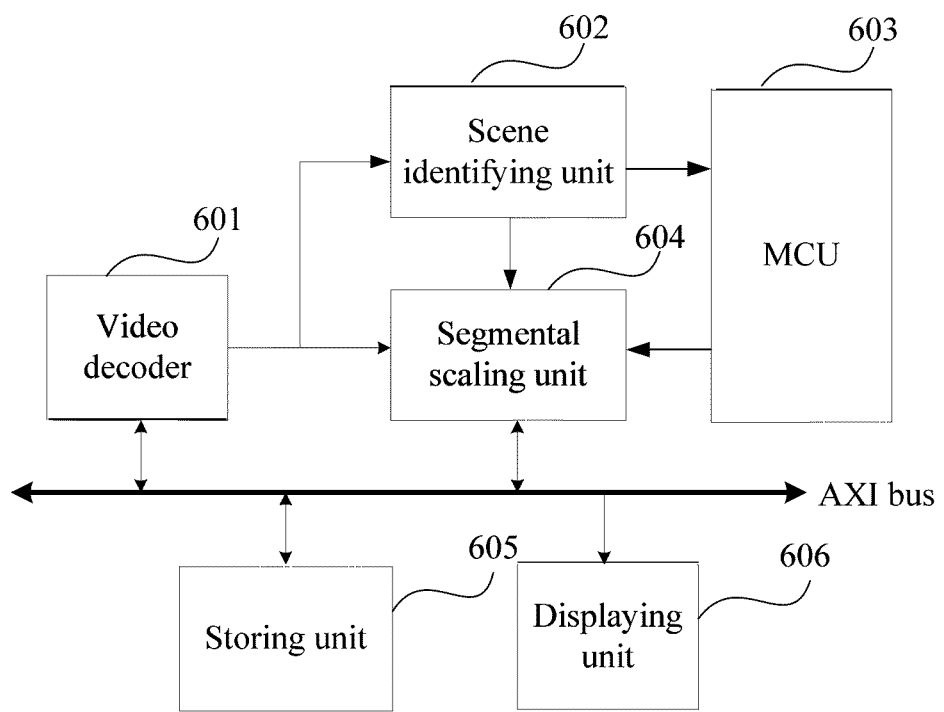
FIG. 6 shows a structure of a system for applying an apparatus for scaling an image in segments in an embodiment of the present disclosure.

FIG. 6 shows a structure of a system for applying an apparatus for scaling an image in segments in an embodiment of the present disclosure. The system includes six parts: a video decoder 601, a scene identifying unit 602, a segmental scaling unit 604, a Micro Control Unit (MCU) 603, a storing unit 605, and a displaying unit 606.

The video decoder 601 reads video streams from the storing unit 605, decodes the streams to generate YUV image data, and outputs the image data to the scene identifying unit 602. The scene identifying unit 602 performs relevant data statistics for the YUV data to obtain the corresponding parameters, and sends the decoded image data to the storing unit 605 through an AXI bus. The MCU 603 obtains the relevant statistic parameters, identifies the scene, obtains the information about the area occupied by a person, and configures the segmental scaling unit 604. The segmental scaling unit 604 reads the YUV image data in the storing unit 605 through the AXI bus, performs the corresponding segmental scaling, and generates the final image data suitable for display. The displaying unit 606 reads the image and displays it onto the Liquid Crystal Display (LCD) screen.

Through intelligent dynamic segmental scaling, the system in this embodiment displays the key features (such as persons) in a scene always at a proper scale in the screen, and improves the effect of watching videos on a wide screen significantly. Meanwhile, the process and the architecture of this solution comply with the concept of streamline design.

Those skilled in the art should understand that all or part of the steps of the method specified in any embodiment above may be implemented by a program instructing relevant hardware. The program may be stored in a computer readable storage medium such as a Read Only Memory/Random Access Memory (ROM/RAM), a magnetic disk or a Compact Disk-Read Only Memory (CD-ROM). When the program runs, the program performs all or part of the steps described above.

Described above are the objectives, technical solution and benefits of the embodiments of the present disclosure. Although the disclosure has been described through some exemplary embodiments, the disclosure is not limited to such embodiments. It is apparent that those skilled in the art can make modifications and variations to the disclosure without departing from the spirit and scope of the disclosure. The disclosure is intended to cover the modifications and variations provided that they fall within the scope of protection defined by the following claims or their equivalents.

What is claimed is:

1. A method for scaling an image in segments, the method comprising:
   identifying scene features in a sequence of video frames;
   determining a distribution of scene features in the sequence of video frames;
   splitting a first video frame in the sequence of frames into a plurality of blocks;
   assigning importance grade coefficients to the plurality of blocks in accordance with the distribution of scene features;
   obtaining scaling coefficients for the plurality of blocks in accordance with the importance grade coefficients, wherein at least some of the blocks have different scale coefficients; and
   scaling each block in the plurality of blocks in accordance with the scaling coefficients.

2. The method according to claim 1, wherein scaling each block in the plurality of blocks in accordance with the scaling coefficients comprises:
   applying a fourth-order 32-phase interpolation algorithm in a horizontal direction, and a second-order 32-phase interpolation algorithm in a vertical direction in each of the plurality of blocks according to the scaling coefficients;
   using an interpolation filtering unit for the horizontal direction and the vertical direction; and
   reusing a same interpolator on a time-sharing basis in the horizontal direction and the vertical direction to scale the image.

3. An apparatus for scaling an image in segments, the apparatus comprising:
   a scene identifying unit, configured to identify a distribution of scene features in a sequence of video frames; and
   a segmental scaling unit, configured to: split a first video frame in the sequence of frames into a plurality of blocks; assign importance grade coefficients to the plurality of blocks in accordance with the distribution of scene features; obtain scaling coefficients for the plurality of blocks in accordance with the importance grade coefficients; and scale each block in the plurality of blocks in accordance with the scaling coefficients.

4. The apparatus according to claim 3, wherein the segmental scaling unit is configured to scale each block in the plurality of blocks by applying a fourth-order 32-phase interpolation algorithm in a horizontal direction and a second-order 32-phase interpolation algorithm in a vertical direction in each of the blocks according to the scaling coefficients; use an interpolation filtering unit uniformly; and reuse a same interpolator on a time-sharing basis in the horizontal direction and the vertical direction to scale the image.

5. The apparatus according to claim 3, wherein the apparatus is implemented in hardware that is instructed by a program.

6. The apparatus according to claim 3, wherein identifying the distribution of scene features in the video frame comprises using feature matching to identify the scene features in the sequence of video frames.

7. The apparatus according to claim 6, wherein using feature matching to identify the scene features includes performing face detection on frames in the sequence of frames.

8. The apparatus according to claim 7, wherein performing face detection includes utilizing a Haar detection technique.

9. The apparatus according to claim 3, wherein assigning importance grade coefficients comprises:
   assigning higher importance grade coefficients to blocks depicting portions of a human face than to blocks not depicting portions of a human face.

10. The apparatus according to claim 9, wherein at least some blocks in the plurality of blocks have different importance grade coefficients.

11. The apparatus according to claim 10, wherein blocks having different importance grade coefficients have different scaling coefficients.

12. The apparatus according to claim 3, wherein the apparatus is implemented in hardware.

13. The method according to claim 1, wherein identifying the distribution of scene features in the sequence of video frames comprises using feature matching to identify scene features in the sequence of video frames.

14. The method according to claim 1, wherein using feature matching to identify the scene features includes performing face detection on frames in the sequence of frames.

15. The method according to claim 1, wherein performing face detection includes utilizing a Haar detection technique.

16. The method according to claim 1, wherein assigning importance grade coefficients comprises:
   assigning higher importance grade coefficients to blocks depicting portions of a human face than to blocks not depicting portions of a human face.

17. The method according to claim 1, wherein at least some of the blocks have different importance grade coefficients.

18. The method according to claim 17, wherein blocks having different importance grade coefficients have different scaling coefficients.

19. The method according to claim 1, wherein the method is implemented by a program instructing hardware.

20. An apparatus comprising:
   a processor; and
   a computer readable storage medium storing programming for execution by the processor, the programming including instructions to:
   identify scene features in a sequence of video frames;
   determine a distribution of scene features in the sequence of video frames;
   split a first video frame in the sequence of frames into a plurality of blocks;
   assign importance grade coefficients to the plurality of blocks in accordance with the distribution of scene features;
   obtain scaling coefficients for the plurality of blocks in accordance with the importance grade coefficients; and
   scale each block in the plurality of blocks in accordance with the scaling coefficients.

21. The apparatus according to claim 20, wherein at least some of the blocks have different importance grade coefficients.

22. The apparatus according to claim 21, wherein blocks having different importance grade coefficients have different scaling coefficients.

\* \* \* \* \*